US008654059B2

(12) United States Patent
Tsuchida et al.

(10) Patent No.: US 8,654,059 B2
(45) Date of Patent: *Feb. 18, 2014

(54) LIGHT EMITTING ELEMENT DRIVE APPARATUS AND PORTABLE APPARATUS USING SAME

(75) Inventors: Kazuhito Tsuchida, Kanagawa (JP); Junji Saito, Tokyo (JP); Kazuo Sudo, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 1729 days.

This patent is subject to a terminal disclaimer.

(21) Appl. No.: 12/076,996

(22) Filed: Mar. 26, 2008

(65) Prior Publication Data

US 2008/0204381 A1 Aug. 28, 2008

Related U.S. Application Data

(63) Continuation of application No. 10/512,982, filed as application No. PCT/JP03/06735 on May 29, 2003, now Pat. No. 7,365,718.

(30) Foreign Application Priority Data

May 31, 2002 (JP) .................................. 2002-160536

(51) Int. Cl.
*G09G 3/36* (2006.01)

(52) U.S. Cl.
USPC ........... 345/102; 345/82; 315/291; 315/185 R

(58) Field of Classification Search
USPC .......................................................... 345/102
See application file for complete search history.

(56) References Cited

U.S. PATENT DOCUMENTS

| 6,486,726 B1 | 11/2002 | Worley et al. |
| 6,888,529 B2 | 5/2005 | Bruning et al. |

(Continued)

FOREIGN PATENT DOCUMENTS

| EP | 0 342 814 | 11/1989 |
| JP | 05-094151 | 4/1993 |

(Continued)

OTHER PUBLICATIONS

International Search Report Sep. 24, 2003.

(Continued)

*Primary Examiner* — Seokyun Moon
(74) *Attorney, Agent, or Firm* — Rader, Fishman & Grauer PLLC

(57) ABSTRACT

A light emitting element drive apparatus capable of always outputting the lowest voltage satisfying the drive conditions and having a high light emitting efficiency and a low power loss, and a portable apparatus using the same, comprising an LED drive apparatus 10 to which LEDs 20-1 to 20-n of different drive voltages required for emitting light are connected in parallel and driving one or more LEDs, wherein the LED drive apparatus 10 has drive circuits 13-1 to 13-n connected to the corresponding LEDs among a plurality of LEDs and driving the corresponding LEDs with luminances based on set values and power supply circuits 14 and 15 for deciding a drive voltage value required for the highest light emission among one or more LEDs driven to emit light based on drive states of drive circuits (for example terminal voltages of the current source) and supplying a drive voltage having at least the decided value to a plurality of LEDs in parallel.

22 Claims, 8 Drawing Sheets

(56) References Cited

U.S. PATENT DOCUMENTS

2002/0047642 A1* 4/2002 Miyagawa .................. 315/307
2004/0233144 A1* 11/2004 Rader et al. .................. 345/82

FOREIGN PATENT DOCUMENTS

| | | |
|---|---|---|
| JP | 5-94151 A | 4/1993 |
| JP | 2001-325824 | 11/2001 |
| JP | 2001-325824 A | 11/2001 |
| JP | 2001-326703 | 11/2001 |
| JP | 2001-326703 A | 11/2001 |
| JP | 2003-152224 | 5/2003 |
| JP | 2003-158199 | 5/2003 |
| JP | 2003-332624 | 11/2003 |
| WO | WO 01/30119 A1 | 4/2001 |
| WO | WO 02/43443 | 5/2002 |

OTHER PUBLICATIONS

Supplementary EPO Search Report mailed Nov. 2, 2005.
Office Action for corresponding Japanese patent application No. 2005-267217 dated Jun. 5, 2007.
Japanese Office Action issued Jul. 26, 2005 for corresponding Japanese Appilcation No. 2002-100536.

\* cited by examiner

LIGHT EMITTING ELEMENT DRIVE APPARATUS AND PORTABLE APPARATUS USING SAME

CROSS REFERENCE TO RELATED APPLICATIONS

This is a Continuation Application of the patent application Ser. No. 10/512,982, having a 371 date of Oct. 29, 2004, now U.S. Pat. No. 7,365,718, which is based on a National Stage Application of PCT/JP03/06735, filed May 29, 2003, which in turn claims priority from Japanese Application No.: 2002-160536, filed on May 31, 2002, the entire contents of which are incorporated herein by reference.

TECHNICAL FIELD

The present invention relates to a light emitting element drive apparatus for driving a plurality of light emitting elements of different drive voltages and a portable apparatus using the same.

BACKGROUND ART

A portable apparatus, such as a mobile phone, is provided with light emitting diodes (hereinafter described as LEDs) as a plurality of light emitting elements of different light emission colors for emitting light as backlight of an image display comprised of, for example, a liquid crystal device (LCD) or displaying an incoming call etc.

Current portable apparatuses are generally provided with red (R) LEDs, green (G) LEDs, blue (B) LEDs, and white LEDs.

These various types of LEDs have different forward voltages (Vf). For example, the forward voltage Vfr of the red LEDs is set at approximately 2.0V, the forward voltages Vfg and Vfb of the green and blue LEDs are set at approximately 3V, and the forward voltage Vfw of the white LEDs is set at approximately 3.5V.

Portable apparatuses mounting various types of LEDs having different forward voltages in this way have a LED drive apparatus for driving these LEDs.

The output voltage in this LED drive apparatus is set by selecting a value satisfying the forward voltage of the maximum value in order to handle the various types of LEDs having different forward voltages. For example, when red LEDs having the forward voltage Vfr of 2.0V and white LEDs having the forward voltage Vfw of 3.5V are driven by the same power supply, the output voltage of the LED drive apparatus is generally fixed to 4.5V to 5.0V by considering the variation of the voltage required for the constant current source and the forward voltage Vfw of the white LEDs.

When using a LED drive apparatus having the output voltage matched with the LEDs having the highest forward voltage, however, for example, red LEDs having a low forward voltage will be driven by a voltage higher than the required drive voltage by 2.0V. As a result, there is an accompanying very large power loss.

Further, as explained above, the apparatus is designed by including an operating margin considering the variation of the LEDs having the high forward voltage. This operating margin becomes one of the factors of power loss.

This problem of power loss lowers the light emitting efficiency of the LEDs remarkably. A portable apparatus is driven by batteries due to its portability, so this power loss will shorten the actual usage time of the portable apparatus.

For this reason, in conventional LED drive circuits, studies are being made for the purpose of raising the efficiency of the charge pump or DC-DC converter serving as the power supply. However, the efficiency of these circuits has already exceeded 90%. Therefore it becomes difficult to extend the actual usage time even if the efficiency is raised more than this.

On the other hand, there is a method of connecting a few LEDs in series and driving them by a boosted power supply as a means for solving the above problem.

By using this method, the output of the LED drive circuit is controlled to the voltage of the required lowest limit, so a high efficiency (high light emitting efficiency) can be expected.

However, this method involves the following problems.

First, since the output voltage becomes high, a high voltage resistance process becomes necessary.

Second, for an output within the voltage resistance, driving three to four LEDs is the limit.

Third, the LEDs are connected in series, so independent control of the LEDs is difficult.

The third problem is especially large. The function of "many LEDs emitting light in various ways" expected from portable apparatuses in recent years is not satisfied.

DISCLOSURE OF THE INVENTION

An object of the present invention is to provide a light emitting element drive apparatus not requiring a high voltage resistance process, capable of increasing the light emitting elements that can be driven and capable of independently controlling each of a plurality of light emitting elements, capable of constantly outputting the lowest voltage satisfying the drive conditions even if individually adjusting the luminances of the plurality of light emitting elements and even if simultaneously driving a plurality of light emitting elements of different drive voltages, and having a high light emitting efficiency and low power loss and a portable apparatus using the same.

To attain the above object, a first aspect of the present invention is a light emitting element drive apparatus wherein a plurality of light emitting elements of different drive voltages required for emitting light are connected in parallel and one or more light emitting elements among the plurality of light emitting elements are driven, comprising a plurality of drive circuits connected to corresponding light emitting elements of the plurality of light emitting elements and driving the corresponding light emitting elements with luminances based on set values, a decision circuit for deciding a drive voltage value required for the highest light emission among one or more light emitting elements driven to emit light based on drive states of the plurality of drive circuits, and a power supply circuit for supplying a drive voltage to the plurality of light emitting elements in response to the decision result of the decision circuit.

A second aspect of the present invention is a portable apparatus having a battery as a power supply voltage source, comprising a plurality of light emitting elements of different drive voltages required for the light emission, at least one illuminated portion illuminated by the light emitting element, and a light emitting element drive apparatus to which the plurality of light emitting elements is connected in parallel and driving one or more light emitting elements among the plurality of light emitting elements, wherein the light emitting element drive apparatus includes a plurality of drive circuits connected to corresponding light emitting elements of the plurality of light emitting elements and driving the corresponding light emitting elements with luminances based on set values, a decision circuit for deciding a drive voltage value required for the highest light emission among one or more light emitting elements driven to emit light based on drive states of the plurality of drive circuits, and a power supply circuit for supplying a power supply voltage as the drive voltage to the plurality of light emitting elements in response to the decision result of the decision circuit.

In the present invention, the power supply circuit fixes the output drive voltage of the power supply circuit to a predetermined set voltage irrespective of the drive states of the light emitting elements when receiving a predetermined flash operation instruction command.

In the present invention, the power supply circuit supplies a supplied power supply voltage as the drive voltage to the plurality of light emitting elements when the value of the power supply voltage is larger than the voltage value decided by the decision circuit.

In the present invention, the power supply circuit down-converts a supplied power supply voltage to any value down to the decided voltage value when the value of the power supply voltage is larger than the voltage value decided by the decision circuit and supplies the down-converted power supply voltage as the drive voltage to the plurality of light emitting elements.

In the present invention, the power supply voltage boosts a supplied power supply voltage to at least the decided voltage value when the value of the power supply voltage is smaller than the voltage value decided by the decision circuit and supplies the boosted power supply voltage as the drive voltage to the plurality of light emitting elements.

In the present invention, the power supply circuit down-converts a supplied power supply voltage to any value down to the decided voltage value and supplies the down-converted power supply voltage as the drive voltage to the plurality of light emitting elements when the value of the power supply voltage is larger than the voltage value decided by the decision circuit, supplies the supplied power supply voltage as the drive voltage to the plurality of light emitting elements when the decided voltage value and the value of the power supply voltages are approximately the same, and boosts the supplied power supply voltage to at least the decided voltage value and supplies the boosted power supply voltage as the drive voltage to the plurality of light emitting elements when the value of the power supply voltage is smaller than the voltage value decided by the decision circuit.

In the present invention, the power supply circuit includes a down-converted power supply for down-converting a supplied power supply voltage to any value down to the drive voltage value required for the light emission of the light emitting elements and supplying the down-converted power supply voltage as the drive voltage to the target light emitting elements for the light emitting elements having values of drive voltages required for emitting light smaller than the value of the power supply voltage.

In the present invention, the power supply circuit includes a boosted power supply for boosting a supplied power supply voltage to at least the drive voltage value required for the light emission of the light emitting elements and supplying the boosted power supply voltage as the drive voltage to the target light emitting elements for the light emitting elements having the values of drive voltages required for emitting light larger than the value of the power supply voltage.

According to the present invention, a light emission luminance is given as the set value to a desired drive circuit from, for example, a host apparatus.

Due to this, a corresponding light emitting element is driven so as to emit light with a luminance based on the set value from the drive circuit.

At this time, the decision circuit decides the drive voltage value required for the highest light emission among one or more light emitting elements driven in the light emission based on the drive states of a plurality of drive circuits.

Then, the power supply circuit supplies a drive voltage having at least the decided value to a plurality of light emitting elements in response to the decision result of the decision circuit.

As a result, even if individually adjusting luminances of a plurality of light emitting elements or simultaneously driving a plurality of light emitting elements, the lowest voltage for satisfying the drive conditions can always be output. Accordingly, an improvement of the light emitting efficiency can be achieved and, in addition, a reduction of the power loss can be achieved.

BEST MODE FOR WORKING THE INVENTION

Below, an explanation will be given of embodiments of the present invention with reference to the attached drawings.

First Embodiment

Figure 1:
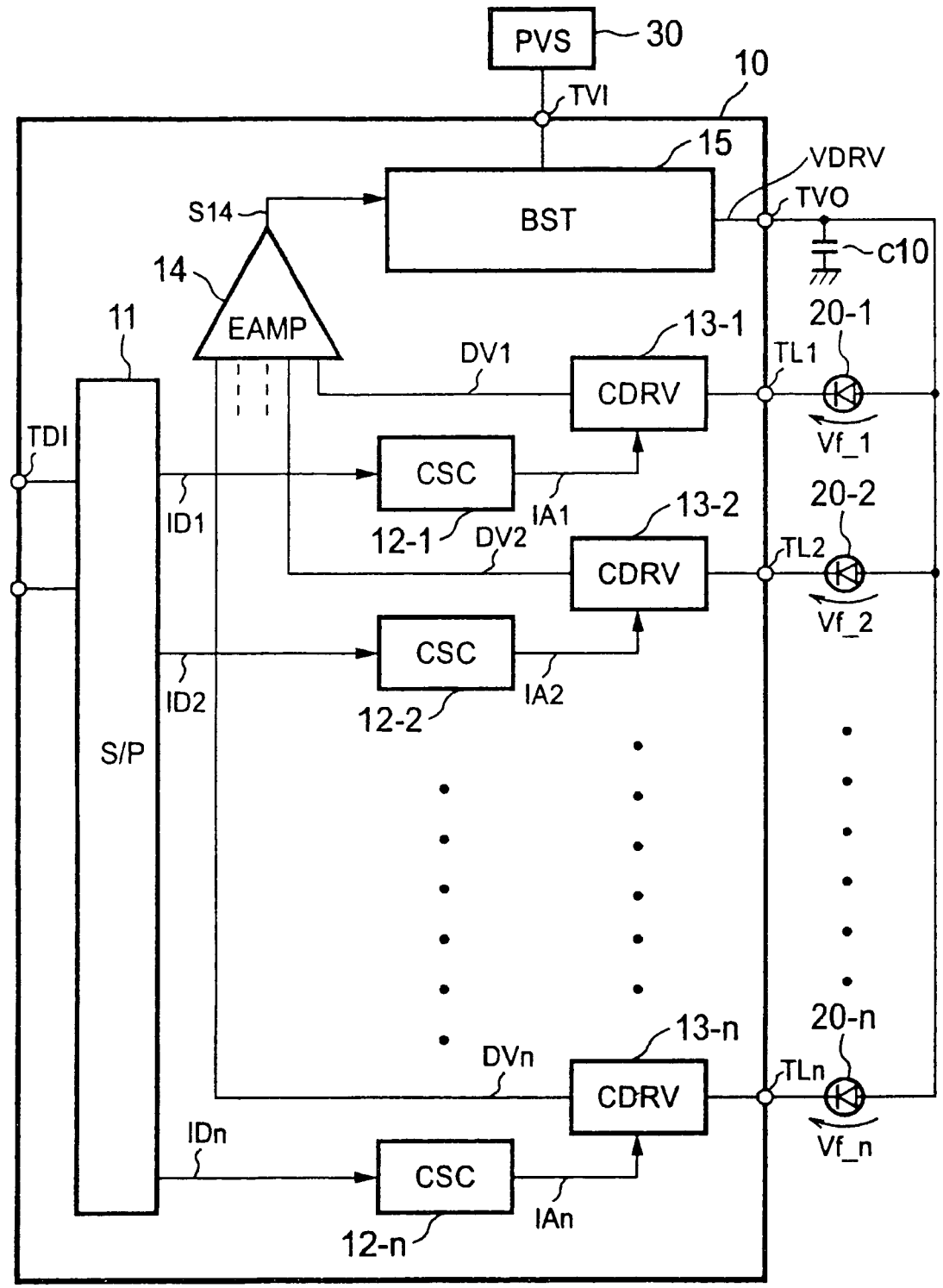
FIG. 1 is a view of the basic configuration of a first embodiment of a LED (light emitting element) drive circuit according to the present invention.

FIG. 1 is a view of the basic configuration of a first embodiment of a LED (light emitting element) drive circuit according to the present invention.

The present LED drive apparatus 10, as shown in FIG. 1, has a plurality n (n is a positive integer) of LEDs 20-1 to 20-$n$ having different drive voltages required for emitting light, that is, forward voltages Vf, connected to it in parallel. These LEDs 20-1 to 20-$n$ are driven with any luminances (drive currents).

At this time, the LED drive apparatus 10 outputs the optimum voltage (for example, the lowest voltage) enabling driving at the set current of the LEDs having the maximum forward voltage Vf among a plurality of LEDs connected in parallel from a terminal TVO to anodes of the LEDs 20-1 to **20-*n***.

Note that the present LED drive apparatus 10 is supplied with a power supply voltage Vcc by a power supply voltage source (PVS) 30, for example, a battery, via a terminal TVI.

Below, the concrete configuration and functions of the LED drive apparatus 10 will be explained sequentially with reference to the drawings.

The LED drive apparatus 10, as shown in FIG. 1, has a serial/parallel conversion circuit (S/P) 11, luminance (current) setting circuits (CSC) 12-1 to **12-*n*, current drive circuits (CDRV) 13-1 to 13-*n*, an error amplifier (EAMP) 14, and a boosted power supply (BST) 15**.

Note that the error amplifier 14 and the boosted power supply 15 form the decision circuit and the power supply circuit according to the present invention.

The serial/parallel conversion circuit 11 converts digital serial data concerning the current (luminance) value to drive the LEDs 20-1 to **20-*n* supplied by the host apparatus, such as a not illustrated CPU, input via the terminal TDI to parallel data and supplies digital data ID1 to IDn concerning the current (luminance) value after the conversion to the corresponding current setting circuits 12-1 to 12-*n***.

The current setting circuit 12-1 is configured by, for example, a digital/analog conversion circuit (DAC), converts the digital data ID1 concerning the drive current (luminance) value supplied by the serial/parallel conversion circuit 11 to a current setting signal IA1 as the analog signal, and supplies the same to the current drive circuit 13-1.

The current setting circuit 12-2 is configured by, for example, a digital/analog conversion circuit (DAC), converts the digital data ID2 concerning the drive current (luminance) value supplied by the serial/parallel conversion circuit 11 to a current setting signal IA2 as the analog signal, and supplies the same to the current drive circuit 13-2.

In the same way, the current setting circuit **12-*n* is configured by, for example, a digital/analog conversion circuit (DAC), converts the digital data IDn concerning the drive current (luminance) value supplied by the serial/parallel conversion circuit 11 to a current setting signal IAn as the analog signal, and supplies the same to the current drive circuit 13-*n***.

The current drive circuit 13-1 has a current source connected to a cathode of the LED 20-1 to be driven via the terminal TL1 and drives the LED 20-1 to emit light with a drive current in accordance with the set value of the current setting signal IA1 as the analog signal supplied by the current setting circuit 12-1.

Further, the current drive circuit 13-1 outputs the voltage of the connecting point of, for example, the terminal TL1 and the current source, that is, a voltage (VDRV-Vf1) obtained by subtracting the forward voltage Vf1 of the LED from the output drive voltage VDRV of the boosted power supply 15, as a detection voltage DV1 to the error amplifier 14.

Note that this detection voltage DV1 becomes a signal indicating the drive state in the current drive circuit 13-1, but the signal indicating the drive state is not limited to this voltage and may be an inter-terminal voltage, etc. of a resistor element 132 (FIG. 2) as well.

The current drive circuit 13-2 has a current source connected to the cathode of the LED 20-2 to be driven via the terminal TL2 and drives the LED 20-2 to emit light with the drive current in accordance with the set value of the current setting signal IA2 as the analog signal supplied by the current setting circuit 12-2.

Further, the current drive circuit 13-2 outputs the voltage of the connecting point of, for example, the terminal TL2 and the current source, that is, a voltage (VDRV-Vf2) obtained by subtracting the forward voltage Vf2 of the LED from the output drive voltage VDRV of the boosted power supply 15, as a detection voltage DV2 to the error amplifier 14.

Note that this detection voltage DV2 becomes a signal indicating the drive state in the current drive circuit 13-2, but the signal indicating the drive state is not limited to this voltage and may be an inter-terminal voltage, etc. of the resistor element 132 (FIG. 2) as well.

In the same way, the current drive circuit **13-*n* has a current source connected to the cathode of the LED 20-*n* to be driven via the terminal TLn and drives the LED 20-*n* to emit light with the drive current in accordance with the set value of the current setting signal IAn as the analog signal supplied by the current setting circuit 12-*n***.

Further, the current drive circuit **13-*n* outputs the voltage of the connecting point of, for example, the terminal TLn and the current source, that is, a voltage (VDRV-Vfn) obtained by subtracting the forward voltage Vfn of the LED from the output drive voltage VDRV of the boosted power supply 15, as a detection voltage DVn to the error amplifier 14**.

Note that this detection voltage DVn becomes a signal indicating the drive state in the current drive circuit **13-*n*, but the signal indicating the drive state is not limited to this voltage and may be an inter-terminal voltage etc. of the resistor element 132 (FIG. 2**) as well.

Figure 2:
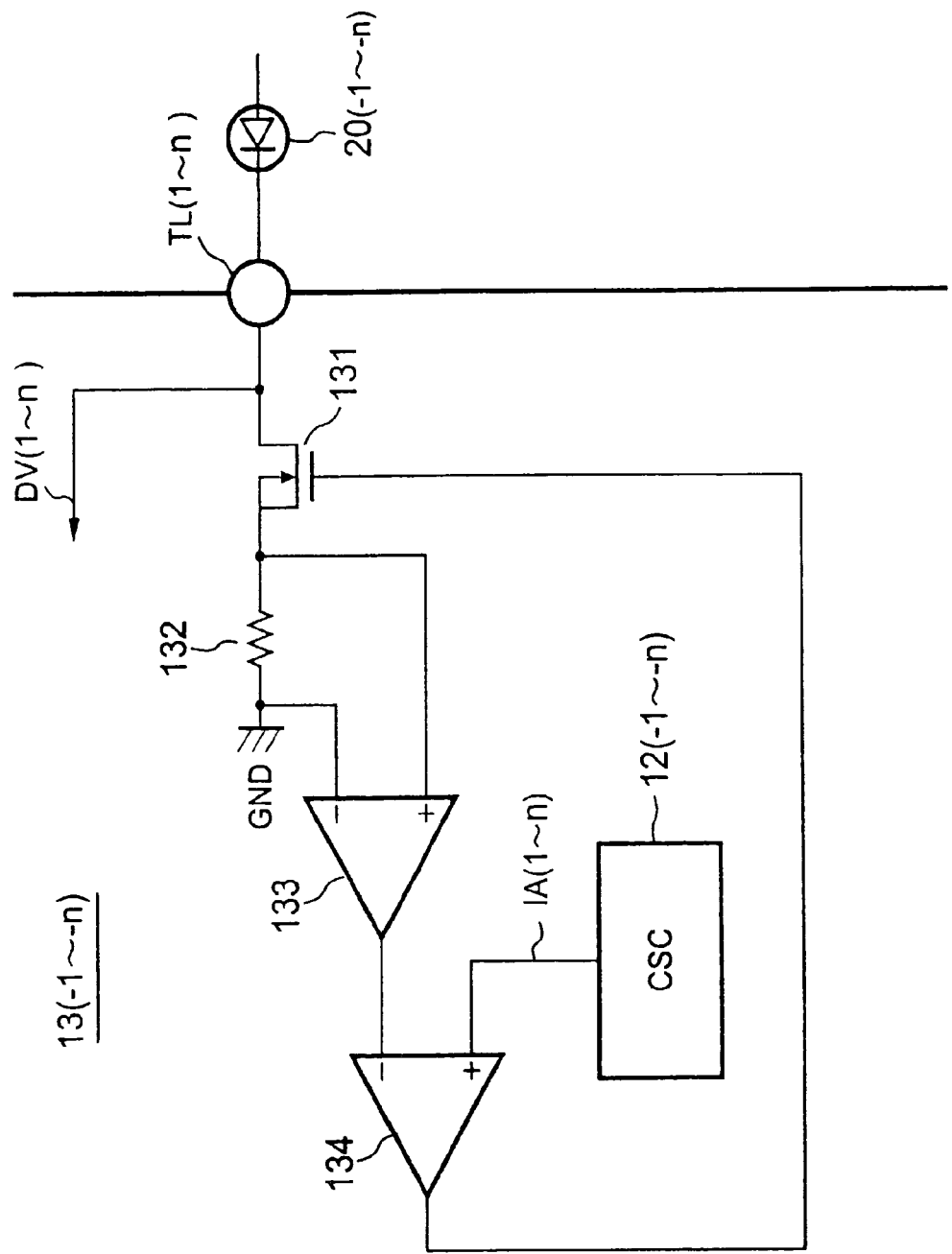
FIG. 2 is a circuit diagram of an example of the configuration of a current drive circuit according to the present embodiment.

FIG. 2 is a circuit diagram of an example of the configuration of the current drive circuit according to the present embodiment.

This current drive circuit 13(-1 to **-*n*), as shown in FIG. 2, has a n-channel MOS (NMOS) transistor 131 as the current source, a sense resistor element 132, a current detection amplifier 133, and a current control amplifier 134**.

A drain of the NMOS transistor 131 is connected to the cathode of the corresponding LED 20 (-1 to **-*n*) via the terminal TL (1 to n), the source is connected to one end of the resistor element 132 and a non-inverted input (+) of the current detection amplifier 133, and a gate is connected to the output of the current control amplifier 134**.

The other end of the resistor element 132 is connected to a ground potential GND and an inverted input (−) of the current detection amplifier 133.

The inverted input (−) of the current control amplifier 134 is connected to the output of the current detection amplifier 133, and the non-inverted input (+) is connected to the supply line of the current setting signal IA (1 to n) as the analog signal by the current setting circuit 12 (-1 to **-*n***).

The current drive circuit 13(-1 to **-*n*) of FIG. 2 drives the gate of the NMOS transistor 131 by the output of the current control amplifier 134, detects the current flowing through the NMOS transistor 131 by the sense resistor element 132, and amplifies the detection by the current detection amplifier 133**.

Then, the gate voltage of the NMOS transistor 131 is controlled by the current control amplifier 134 so that the current flowing through the NMOS transistor 131 becomes the set current value by the current setting circuit 12(-1 to **-*n***).

By this, the LED 20 (-1 to **-*n***) to be driven emits light with the luminance in accordance with the set current.

Further, in the current drive circuit 13(-1 to **-*n*), the drain of the NMOS transistor 131 is connected to the corresponding input terminal of the error amplifier 14 so that the drain voltage of the NMOS transistor 131 as the current source is supplied as the signal DV (1 to n) to the error amplifier 14**.

Further, in the current drive circuit 13(-1 to **-*n*), the lowest operation voltage of the NMOS transistor 131** as the current source and the sense resistor element 132 is set at, for example, about 0.5V to 1V according to the transistor size or resistance value.

The error amplifier 14 compares the detection voltages (drain voltage of the NMOS transistor 131) DV1 to DVn output from n number of current drive circuits 13-1 to 13-n with a reference voltage Vref and outputs a signal S14 in accordance with the difference between the smallest detection voltage and the reference voltage Vref to the boosted power supply 15.

Note that the smallest detection voltage employed in the error amplifier 14 corresponds to the highest forward voltage Vf in other words.

The boosted power supply 15 is configured by, for example, a DC-DC converter, performs DC-DC conversion so that the power supply voltage Vcc from the power supply voltage source 30 supplied via the terminal TVI becomes a value in accordance with the output signal S14 of the error amplifier 14, and supplies a drive voltage VDRV in parallel to n number of LEDs 20-1 to 20-n from the terminal TVO.

Note that an externally attached capacitor C10 is connected between the terminal TVO and the ground potential GND.

The LED drive apparatus 10 according to the present first embodiment is configured so that, for example, if the reference voltage Vref of the error amplifier 14 is 1V, feedback is applied to the boosted power supply so that the terminal voltage to which the cathode of the LED having the maximum forward voltage Vf is connected, in other words, the drain voltage of the NMOS transistor 131 configuring the current source of the current drive circuit, becomes 1V.

Figure 3:
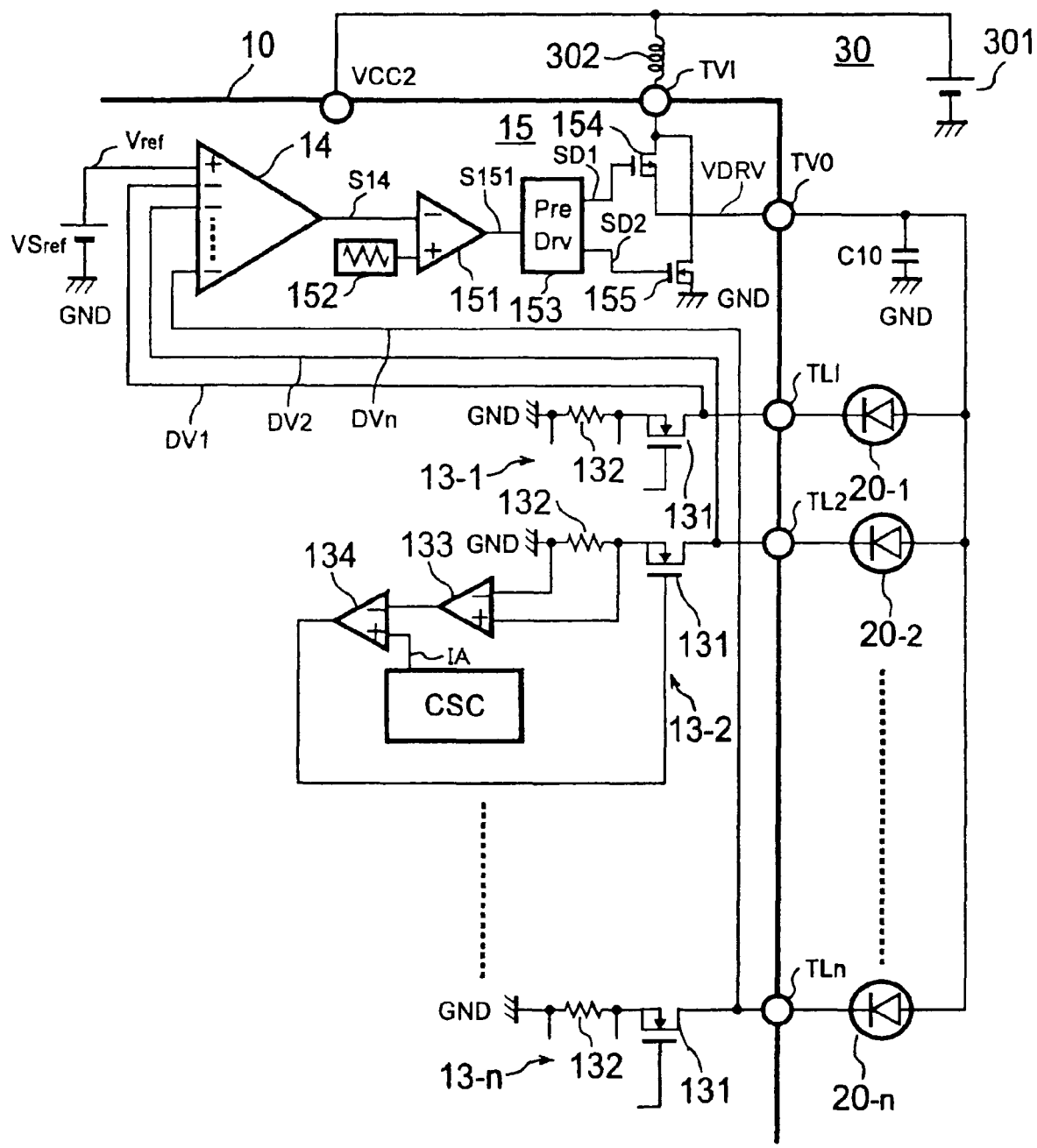
FIG. 3 is an abbreviated circuit diagram of a concrete example of the configuration of a boosted power supply, an error amplifier, a detection voltage output portion of a current drive circuit, and a power supply voltage source according to the present embodiment.

FIG. 3 is an abbreviated circuit diagram of a concrete example of the configuration of the boosted power supply 15, the error amplifier 14, the detection voltage output portion of the current drive circuit, and the power supply voltage source 30 according to the present embodiment.

FIG. 3 illustrates only the current drive circuit 13-2 including the configuration of FIG. 2 for simplifying the drawing and shows only the NMOS transistor 131 as the current source and the sense resistor element 132 for the other current drive circuits.

The boosted power supply 15, as shown in FIG. 3, has a comparator 151, an oscillator 152, a pre-driver 153, a p-channel MOS (PMOS) transistor 154, and a NMOS transistor 155.

The comparator 151 has the inverted input (−) connected to the output of the error amplifier 14, the non-inverted input (+) connected to the output of the oscillator 152, and the output connected to the input of the pre-driver 153.

Further, the PMS transistor 154 has a drain connected to a terminal TVI supplied with the power supply voltage Vcc by the power supply voltage source 30, a source connected to an output terminal TVO of the drive voltage, and a gate connected to the first drive terminal of the pre-driver 153.

The NMOS transistor 155 has a source connected to the ground potential GND, a drain connected to the connecting point of the source of the PMOS transistor 154 and the terminal TVI, and a gate connected to the second drive terminal of the pre-driver 153.

The comparator 151 performs a comparison based on so-called PWM (pulse width modulation), concretely, a comparison between the output signal S14 of the error amplifier 14 and the oscillation signal of the oscillator 152, and outputs a signal S151 in accordance with the comparison result to the pre-driver 153.

The pre-driver 153 outputs drive signals SD1 and SD2 to the first drive terminal and/or from the second drive terminal to the gate of the PMOS transistor 154 and the gate of the NMOS transistor 155 in accordance with the output signal S151 of the comparator 151 and supplies the value of the power supply voltage Vcc supplied from the terminal TVI as it is (through) or after adjustment from the terminal TVO as the drive voltage VDRV to the anodes of the LEDs 20-1 to 20-n in parallel.

Namely, as explained above, the boosted power supply 15 adjusts the value of the power supply voltage Vcc so that the terminal voltage (drain voltage of the NMOS transistor 131 configuring the current source of the current drive circuit) to which the cathode of the LED having the maximum forward voltage Vf is connected becomes the reference voltage Vref set at the error amplifier 14 and outputs the same as the drive voltage VDRV.

Further, the power supply voltage source 30, as shown in FIG. 3, has, for example, a lithium ion battery 301 and an inductor 302 connected between a positive pole of the battery 301 and the terminal TVI of the LED drive device 10.

Next, the operation by the above configuration will be explained.

For example, digital serial data concerning the current (luminance) value for the LEDs 20-1 to 20-n to be driven in accordance with the operation mode are input from the host apparatus to the serial/parallel conversion circuit 11 via the terminal TDI.

The serial/parallel conversion circuit 11 converts the supplied digital serial data concerning the current (luminance) values to drive the LEDs 20-1 to 20-n to parallel data. Then, the digital data ID1 to IDn concerning the current (luminance) values after conversion are supplied to the current setting circuits 12-1 to 12-n.

Note that the digital data ID1 to IDn also include information for not driving the corresponding LEDs.

The current setting circuits 12-1 to 12-n convert the digital data ID1 concerning the drive current (luminance) values supplied by the serial/parallel conversion circuit 11 to current setting signals IA1 to Ian as the analog signals and supply them to corresponding current drive circuits 13-1 to 13-n.

The current drive circuits 13-1 to 13-n drive the LEDs 20-1 to 20-n with the drive currents in accordance with the set values of the current setting signals IA1 to IAn as the analog signals supplied by the current setting circuits 12-1 to 12-n. By this, the LEDs 20-1 to 20-n emit light with luminances in accordance with the set current values or are held in an off state.

Further, the current drive circuits 13-1 to 13-n output voltages of the connecting points of the terminals TL1 to TLn and the current source, that is, voltages (VDRV−Vf1) to (VDRV−Vfn) obtained by subtracting the forward voltages Vf1 to Vfn of the LEDs from the output drive voltage VDRV of the boosted power supply 15, as the detection voltages DV1 to DVn to the error amplifier 14.

The error amplifier 14 compares the detection voltages (drain voltages of the NMOS transistor 13) DV1 to DVn output from n number of current drive circuits 13-1 to 13-n with the reference voltage Vref. As the result of the comparison, a signal S14 in accordance with the difference between the smallest detection voltage and the reference voltage Vref is output to the boosted power supply 15.

The boosted power supply 15 performs the DC-DC conversion so that the power supply voltage Vcc from the power supply voltage source 30 supplied via the terminal TVI becomes a value in accordance with the output signal S14 of the error amplifier 14. Then, the drive voltages VDRV are supplied in parallel to n number of LEDs 20-1 to 20-n from the terminal TVO.

Concretely, the comparator 151 of the boosted power supply 15 compares the output signal S14 of the error amplifier 14 and the oscillation signal of the oscillator 152 and outputs a signal S151 in accordance with the comparison result to the pre-driver 153.

The pre-driver 153 outputs the drive signals SD1 and SD2 to the first drive terminal and/or from the second drive terminal to the gate of the PMOS transistor 154 and the gate of the NMOS transistor 155 in accordance with the output signal S151 of the comparator 151. Due to this, the values of the power supply voltage Vcc supplied from the terminal TVI are supplied in parallel to the anodes of the LEDs 20-1 to 20-$n$ from the terminal TVO as they are (through) or after adjustment (boosted).

Namely, the boosted power supply 15 adjusts the value of the power supply voltage Vcc so that the voltage of the terminal to which the cathode of the LED having the maximum forward voltage Vf is connected (drain voltage of the NMOS transistor 131 configuring the current source of the current drive circuit) becomes the reference voltage Vref set in the error amplifier 14 and outputs the same as the drive voltage VDRV.

The concrete operation of the boosted power supply 15 to the light emission (turning on) of the LEDs of each color becomes as follows.

Note that, here, the LEDs 20-1 to 20-$n$ include one or more red (R) LEDs, green (G) LEDs, blue (B) LEDs, and white LEDs.

The forward voltages of the colors of the LEDs are as follows.

The forward voltage Vfr of the red LEDs is set at 1.9V, the forward voltages Vfg and Vfb of the green and blue LEDs are set at approximately 3.1V, and the forward voltage Vfw of the white LEDs is set at 3.5V.

Further, assuming that the power supply voltage source 30 is a lithium ion battery, the power supply voltage Vcc is used within a range of from 3.2V to 4.2V.

Further, assume that the lowest operation voltage a required for the current drive circuits 13-1 to 13-$n$ of the LEDs is made 0.5V.

Further, in the following explanation, the term "through" indicates that the PMOS transistor 154 configuring the output stage of the boosted power supply 15 is made on, and the NMOS transistor is made off (the DC-DC converter operates with 100% duty).

In order to turn on the white LEDs having the forward voltage Vfw of 3.5V, the voltage required as the drive voltage VDRV is 4V (=3.5V+0.5V).

The operation of the boosted power supply 15 in this case becomes "through" where the power supply voltage Vcc is within a range of 4.0V<Vcc<4.2V.

On the other hand, when the power supply voltage Vcc is within a range of 3.2V<Vcc<4.0V, the operation is for "boosting" to, for example, 4V.

In order to turn on the green LEDs and the blue LEDs having the forward voltages Vfg and Vfb of 3.1V, the voltage required as the drive voltage VDRV is 3.6V (=3.1V+0.5V).

The operation of the boosted power supply 15 in this case becomes "through" where the power supply voltage Vcc is within a range of 3.6V<Vcc<4.2V.

On the other hand, when the power supply voltage Vcc is within the range of 3.2V<Vcc<3.6V, the operation is for "boosting" to, for example, 3.6V.

In order to turn on the red LEDs having the forward voltage Vfr of 1.9V, the voltage required as the drive voltage VDRV is 2.4V (−1.9V+0.5V).

The operation of the boosted power supply 15 in this case becomes "through" within the whole range since it is assumed that the power supply voltage Vcc is within the range of 3.2V<Vcc<4.2V. In the first embodiment, the down-converted power supply is not included.

That is, the operation of the boosted power supply 15 becomes "through" where the output of the boosted power supply 15 expected by applying feedback via the error amplifier 14 is less than the power supply voltage (battery voltage) Vcc, so the LEDs will be directly driven by the power supply voltage Vcc. Here, the loss of the power will be considered.

For example, when turning on only the blue LEDs having the forward voltage Vfb of 3.1V when the power supply voltage Vcc is 4.0V, the required drive voltage VDRV is 3.6V (=3.1V+0.5V), so (4.0V−3.6V)×(drive current) becomes the loss.

As explained above, according to the present first embodiment, provision is made of the current drive circuits 13-1 to 13-$n$ having the current source connected to the cathodes of the LEDs 20-1 to 20-$n$ as the drive targets via the terminals TL1 to TLn, driving the LEDs 20-1 to 20-$n$ with the drive currents in accordance with the set values of the current setting signals IA1 to IAn to emit light, and outputting the voltages of the connecting points between the terminals TL1 to TLn and the current source as the detection voltages DV1 to DVn, the error amplifier 14 for comparing the detection voltages DV1 to DVn output from n number of current drive circuits 13-1 to 13-$n$ with the reference voltage Vref and outputting the signal S14 in accordance with the difference between the smallest detection voltage and the reference voltage Vref, and the boosted power supply 15 for performing the DC-DC conversion so that the power supply voltage Vcc from the power supply voltage source 30 supplied via the terminal TVI becomes a value in accordance with the output signal S14 of the error amplifier 14 and supplying the drive voltages VDRV in parallel from the terminal TVO to n number of LEDs 20-1 to 20-$n$, and therefore the boosted power supply 15 adjusts the value of the power supply voltage Vcc so that the voltage of the terminal connected with the cathode of the LED having the maximum forward voltage Vf becomes the reference voltage Vref set at the error amplifier 14 and can output the same as the drive voltage VDRV.

As a result, not only is a high voltage resistance process unnecessary, the light emitting elements that can be driven are increased, and each of the plurality of light emitting elements can be independently controlled, but also the lowest voltage satisfying the drive conditions always can be output even if the luminances of a plurality of LEDs are individually adjusted and even if a plurality of LEDs having different forward voltages are driven simultaneously.

Accordingly, there are the advantages that an improvement of the light emitting efficiency can be achieved and a reduction of the power loss can be achieved.

In actual computation, a conventional device has a light emitting efficiency of about 50%, but in a device according to the present embodiment, a light emitting efficiency of about 70% can be realized.

Second Embodiment

Figure 4:
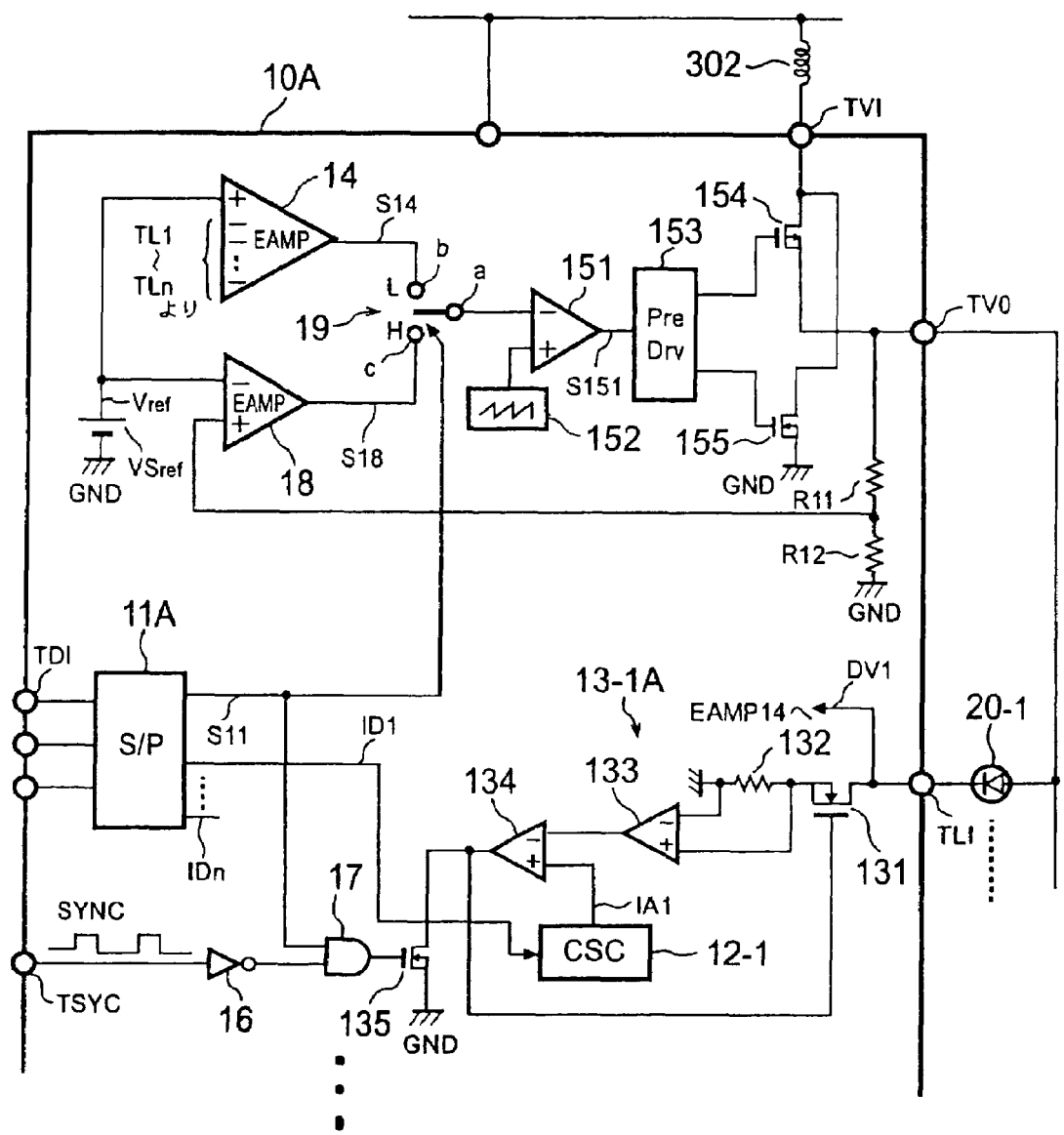
FIG. 4 is a circuit diagram of the principal configuration of a second embodiment of a LED (light emitting element) drive circuit according to the present invention.

FIG. 4 is a circuit diagram of the principal configuration of a second embodiment of a LED (light emitting element) drive circuit according to the present invention.

In FIG. 4, the same components as those of FIG. 1 are represented by the same notations.

Further, in FIG. 4, for simplification of the drawing, only the LED 20-1 is illustrated and only the current setting circuit 12-1 and the current drive circuit 13-1A are illustrated corresponding to this, and the other current setting circuits 12-1 to 12-*n* and the current drive circuits 13-2A to 13-*n*A not illustrated in FIG. 4 also have the same configurations.

The LED drive apparatus 10A according to the present second embodiment has the configuration for making (turning on) the LEDs of the first embodiment emit light explained above plus a configuration for making them flash.

The LED drive apparatus 10A is concretely provided with an inverter 16, a 2-input AND gate 17, a second error amplifier 18, a switch circuit 19, and output voltage division use resistor elements R11 and R12.

Further, each current drive circuit 13-1A (to 13-*n*A) is provided with a NMOS transistor 135 having a source connected to the ground potential GND, a drain connected to the output of the current control amplifier 134, and a gate connected to the output of the AND gate 17.

Further, the serial/parallel conversion circuit 11A is supplied with digital data indicating the drive current (luminance) value plus a command indicating whether to perform a normal turning on operation or a flashing operation at the terminal TDI.

The serial/parallel conversion circuit 11A outputs a low level signal S11 to one input of the AND gate 17 and the switch circuit 19 in the case of a command for a normal operation, and outputs a high level signal S11 in the case of a command for a flashing operation.

The input of the inverter 16 is connected to an input terminal TSYC of a pulse-like synchronization signal SYNC supplied by a not illustrated external synchronization signal supply circuit (for example sound source IC), while the output is connected to the other input of the AND gate 17. The output of the AND gate 17 is connected to the gate of the NMOS transistor 135 provided in each current drive circuit 13-1A (to 13-*n*A).

The resistor elements R11 and R12 are connected in series between the connecting point of the source of the PMOS transistor 154 of the boosted power supply 15 and the terminal TVO and the ground potential GND, and the connecting point of the resistor elements R11 and R12 is connected to the inverted input (−) of the second error amplifier 18.

The non-inverted input (+) of the second error amplifier 18 is supplied with the reference voltage from the voltage source VSref.

The switch circuit 19 has a fixed output terminal a and switch input terminals b and c; the fixed output terminal a is connected to the inverted input (−) of the comparator 151 of the boosted power supply 15; the switch input terminal b is connected to the output of the first error amplifier 14; and the switch input terminal c is connected to the output of the second error amplifier 18.

When the switch circuit 19 receives the signal S11 from the serial/parallel conversion circuit 11A at the low level (normal turning on indication), it connects the fixed output terminal a and the switch input terminal b and inputs the output signal S14 of the first error amplifier 14 to the inverted input (−) of the comparator 151.

In this case, since the signal S11 is at the low level, the output of the AND gate 17 is held at the low level. Accordingly, the NMOS transistor 135 provided in each current drive circuit 13-1A (to 13-*n*A) is held in the OFF state.

Namely, at the time of the normal turning on, in terms of the circuit, it becomes equivalent to the circuit according to the first embodiment explained above.

The operation at the time of turning on is carried out in the same way as in the case of the first embodiment. Accordingly, a detailed explanation is omitted here.

When the switch circuit 19 receives the signal S11 from the serial/parallel conversion circuit 11A at the high level (flashing operation indication), it connects the fixed output terminal a and the switch input terminal c and inputs the output signal S18 of the second error amplifier 18 to the inverted input (−) of the comparator 151.

In this case, since the signal S11 is at the high level, the output of the AND gate 17 is switched to the high level and the low level in accordance with the inversion signal of the synchronization signal SYC.

Accordingly, the NMOS transistor 135 provided in each current drive circuit 13-1A (to 13-*n*A) becomes the ON state when the output of the AND gate 17 is at the high level. At this time, the output of the current control amplifier 134 is connected to the ground potential, so the NMOS transistor 131 serving as the current source is held in the OFF state, and the corresponding LEDs 20-1 (to 20-*n*) are held in the non-light emission state.

On the other hand, the NMOS transistor 135 provided in each of the current drive circuits 13-1A (to 13-*n*A) becomes OFF when the output of the AND gate 17 is at the low level. At this time, the NMOS transistor 131 serving as the current source is driven by the output of the current control amplifier 134, and the corresponding LEDs 20-1 (to 20-*n*) are held in the light emitting state.

Namely, the LEDs 20-1 (to 20-*n*) perform the flashing operation.

At the time of this flashing operation, as explained above, the circuit configuration for applying feedback of the output voltage to the boosted power supply 15 via the second error amplifier 18 is exhibited as explained above.

Due to this, the output drive voltage VDRV of the boosted power supply 15 is fixed to the voltage set inside not according to the operation state of the LED.

In the second embodiment, at the time of the flashing operation, the reason for making the circuit configuration one for applying feedback of the output voltage to the boosted power supply 15 via the second error amplifier 18 for fixing the output drive voltage VDRV at the voltage set inside not according to the operation state of the LED is as follows.

For example, when assuming an operation where the red LEDs and the blue LEDs flash alternately flash if pursuing efficiency, the operation is desirably carried out so that the output voltage of the boosted power supply is down-converted at the time of light emission of the red LEDs and the output voltage rises at the time of the light emission of the blue LEDs, thereby raising the efficiency of the entire system.

In actuality, however, due to fluctuation of the output of the boosted power supply 15 in synchronization with the synchronization signal, generation of noise is a concern.

Therefore, at the time of a flashing operation, by applying feedback of the output voltage of the boosted power supply 15 via the second error amplifier 18 and fixing the output drive voltage VDRV at the voltage set inside not according to the operation state of the LEDs, fluctuation of the output of the boosted power supply 15 at the time of the flashing of the LEDs is suppressed.

According to the second embodiment, at the time of the normal turning on operation, in addition to an effect the same as that obtained by the first embodiment explained above, at the time of the flashing operation, there are the advantages that the fluctuation of the output of the boosted power supply 15 is suppressed and a stable flashing operation can be carried out without the influence of noise.

Note that the second embodiment was configured to apply feedback to the output voltage of the boosted power supply 15 via the second error amplifier 18 and fix the output drive voltage VDRV to the voltage set inside not according to the operation state of the LED when receiving a predetermined flashing operation instruction command, but when, for example, there is no influence of noise due to the flashing operation with a low frequency, it also is possible to configure the device so as to, in the same way as the normal turning on operation, apply feedback via the first error amplifier 14 and, when there is an influence of noise by the predetermined flashing operation with a high frequency, apply feedback to the boosted power supply 15 via the second error amplifier 18 and fix the output drive voltage VDRV to the voltage set inside not according to the operation state of the LED.

Third Embodiment

Figure 5:
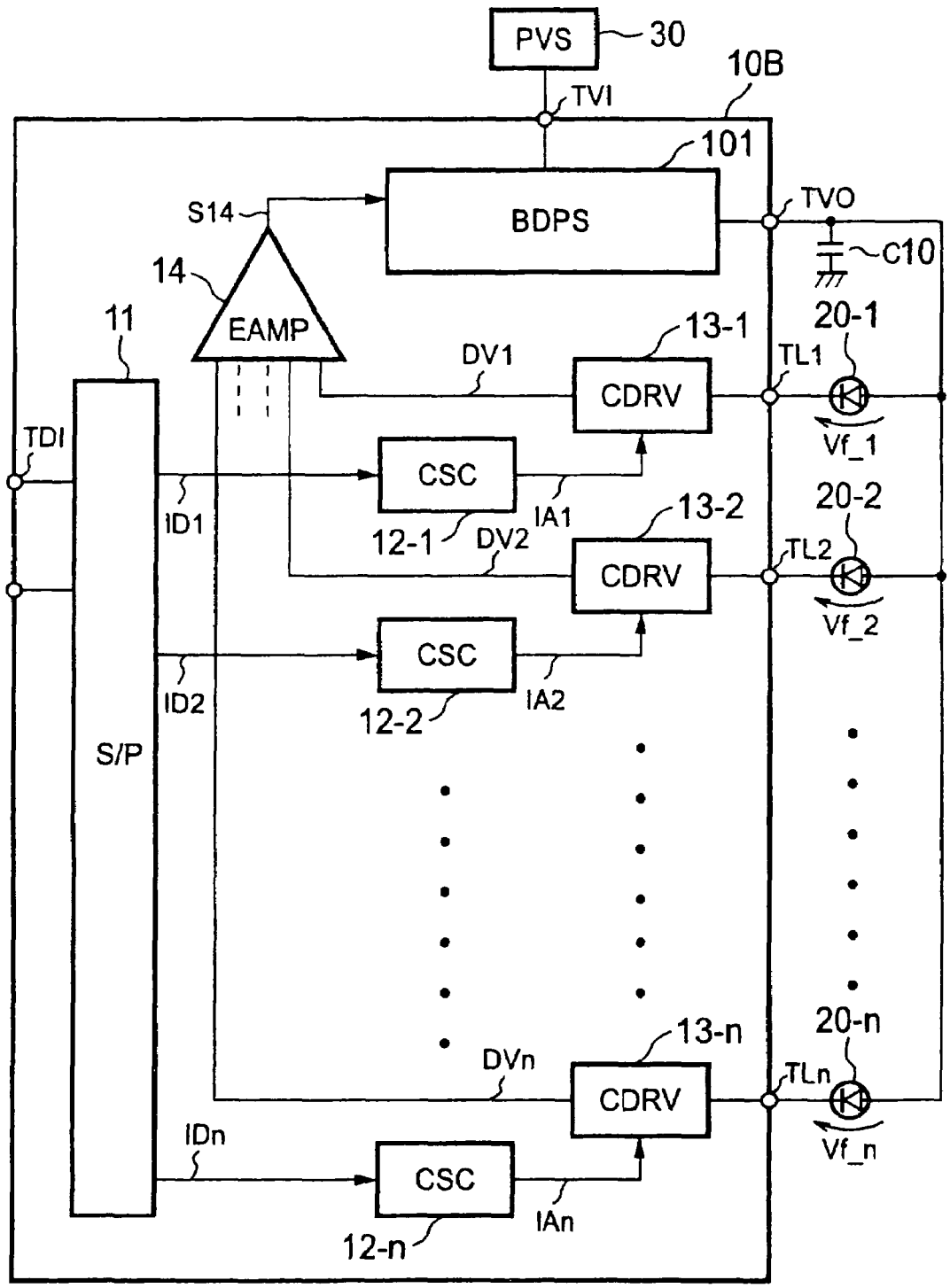
FIG. 5 is a view of the basic configuration of a third embodiment of a LED (light emitting element) drive circuit according to the present invention.

FIG. 5 is a view of the basic configuration of a third embodiment of a LED (light emitting element) drive circuit according to the present invention.

The difference of the third embodiment from the above first embodiment resides in that a boosted/down-converted power supply (BDPS) 101 including a down-conversion function in addition to a boosting function is provided in place of the boosted power supply as the power supply circuit for outputting the drive voltage.

Figure 6:
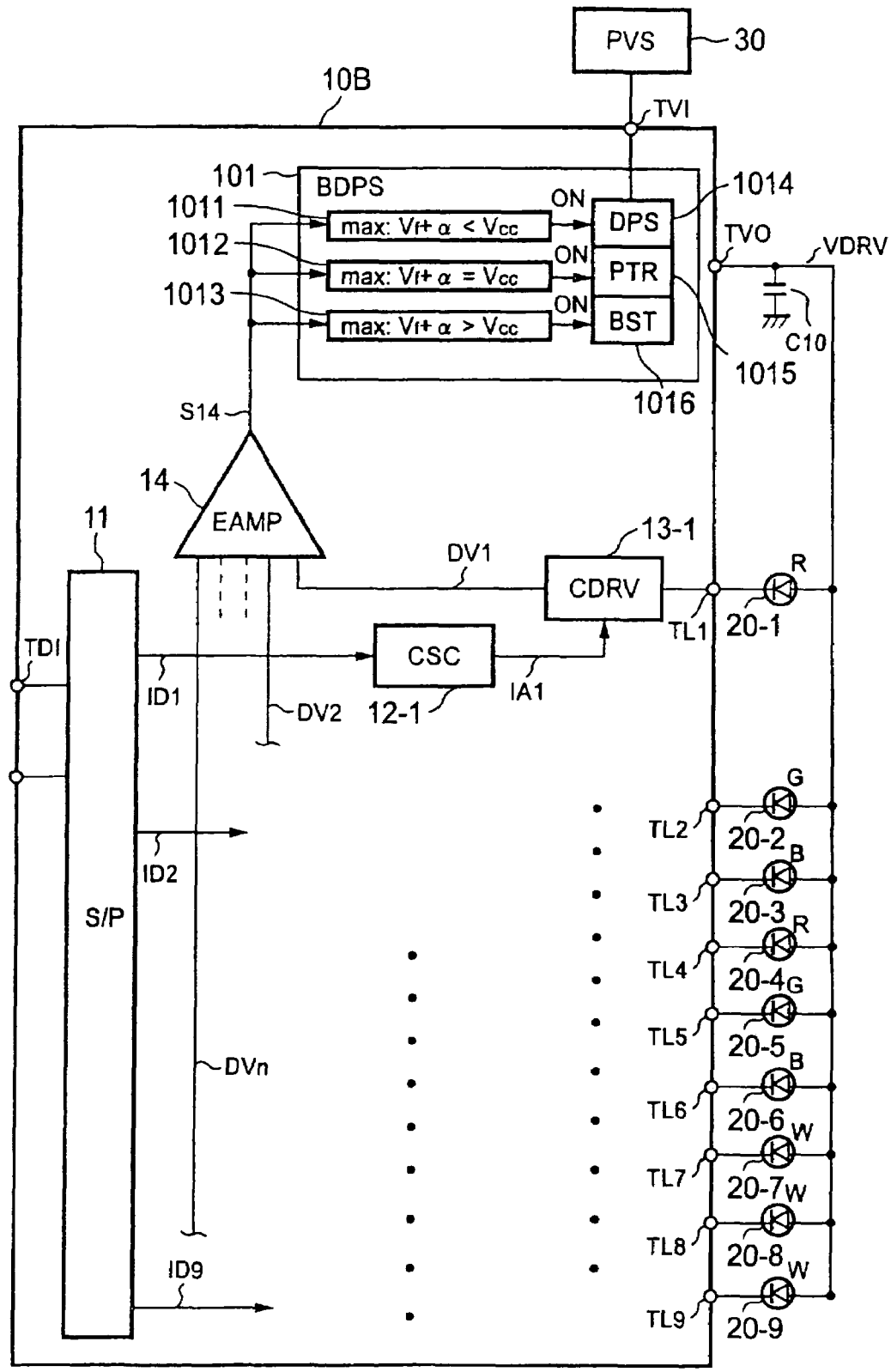
FIG. 6 is a view for explaining the configuration and functions of a boosted/down-converted power supply according to a second embodiment.

FIG. 6 is a view for explaining the configuration and function of the boosted/down-converted power supply 101 according to the third embodiment.

In the example of FIG. 6, nine (n=9) LED's, LED 20-1 to LED 20-9 are provided in parallel.

Among the nine LEDs, two LEDs 20-1 and 20-4 are red LEDs, two LEDS 20-2 and 20-5 are green LEDs, two LEDs 20-3 and 20-6 are blue LEDs, and three LEDs 20-7 to 20-9 are white LEDs.

Further, corresponding to the LEDs 20-1 to 20-9, the current setting circuits 12-1 to 12-9 and the current drive circuits 13-1 to 13-9 are provided; but in FIG. 6, for simplification of the drawing, only the current setting circuit 12-1 and the current drive circuit 13-1 are illustrated.

The boosting/down-converting circuit 101, as shown in FIG. 6, has a down-converting power supply drive circuit 1011, a power supply through circuit drive circuit 1012, a boosted power supply drive circuit 1013, a down-converted power supply (DPS) 1014, a power supply through circuit (PTR) 1015, and a boosted power supply (BST) 1016.

The down-converted power supply drive circuit 1011 receives the output signal S14 of the error amplifier 14 and drives the down-converted power supply 1014 when the value obtained by adding the lowest operation voltage α (for example, 0.5V) required for the current drive circuits 13-1 to 13-9 of the LEDs to the maximum forward voltage Vf of the driven LEDs is smaller than the value of the power supply voltage Vcc from the power supply voltage source 30.

The power supply through circuit drive circuit 1012 receives the output signal S14 of the error amplifier 14 and drives the power supply through circuit 1015 when the value obtained by adding the lowest operation voltage a required for the current drive circuits 13-1 to 13-9 of the LEDs to the maximum forward voltage Vf of the driven LEDs is equal to the value of the power supply voltage Vcc from the power supply voltage source 30.

The boosted power supply drive circuit 1013 receives the output signal S14 of the error amplifier 14 and drives the boosted power supply 1016 when the value obtained by adding the lowest operation voltage a required for the current drive circuits 13-1 to 13-9 of the LEDs to the maximum forward voltage Vf of the driven LEDs is larger than the value of the power supply voltage Vcc from the power supply voltage source 30.

The down-converted power supply 1014, when driven by the down-converted power supply drive circuit 1011, down-converts the power supply voltage Vcc from the power supply voltage source 30 by exactly the predetermined voltage and outputs the down-converted voltage as the drive voltage VDRV from the TVO.

The power supply through circuit 1015, when driven by the power supply through circuit drive circuit 1012, passes the power supply voltage Vcc from the power supply voltage source 30 as it is and outputs the same as the drive voltage VDRV from the terminal TVO.

The boosted power supply 1016, when driven by the boosted power supply drive circuit 1013, boosts the power supply voltage Vcc from the power supply voltage source 30 by exactly the predetermined voltage and outputs the boosted voltage as the drive voltage VDRV from the terminal TVO.

The concrete operation of the boosted/down-converted power supply 101 with respect to light emission (turning on) of the LEDs of each color is as follows.

Note that the forward voltage of the LEDs of each color is as follows in the same way as in the case of the first embodiment.

The forward voltage Vf of the red LEDs is set at 1.9V, the forward voltages Vfg and Vfb of the green and blue LEDs are set at approximately 3.1V, and the forward voltage Vfw of the white LEDs is set at 3.5V.

Further, assume that the power supply voltage source 30 is a lithium ion battery and the power supply voltage Vcc is used within the range of from 3.2V to 4.2V.

Further, assume the lowest operation voltage a required for the current drive circuits 13-1 to 13-n of the LEDs is 0.5V.

In order to turn on the white LEDs having the forward voltage Vfw of 3.5V, the voltage required as the drive voltage VDRV is 4V (=3.5V+0.5V).

The operation of the boosted/down-converted power supply 101 in this case becomes the "down-conversion" operation when the power supply voltage Vcc is within the range of 4.0V<Vcc<4.2V. Concretely, the down-converted power supply 1014 is driven by the down-converted power supply drive circuit 1011. Due to this, the power supply voltage Vcc is down-converted to 4V or any value down to 4V and output as the drive voltage DVRV from the terminal TVO.

When the power supply voltage Vcc is equal to the voltage required for the drive, the operation becomes "through". Concretely, the power supply through circuit drive circuit 102 drives the power supply through circuit 1015. Due to this, the power supply voltage Vcc of 4V is passed and output as the drive voltage VDRV from the terminal TVO.

On the other hand, when the power supply voltage Vcc is within the range of 3.2V<Vcc<4.0V, the operation becomes a "boosting" operation for raising the voltage to 4V. Concretely, the boosted power supply drive circuit 1013 drives the boosted power supply 1016. Due to this, the power supply voltage Vcc is raised to 4V or a value more than this and output as the drive voltage DVRV from the terminal TVO.

In order to turn on the green LEDs and the blue LEDs having the forward voltages Vfg and Vfb of 3.1V, the voltage required as the drive voltage VDRV is 3.6V (=3.1V+0.5V).

The operation of the boosted/down-converted power supply 101 in this case becomes the "down-conversion" operation when the power supply voltage Vcc is within the range of 3.6V<Vcc<4.2V. Concretely, the down-converted power supply drive circuit 1011 drives the down-converted power supply 1014. Due to this, the power supply voltage Vcc is down-converted to 3.6V or any value up to 3.6V and output as the drive voltage DVRV from the terminal TVO.

When the power supply voltage Vcc is equal to the voltage required for the drive, the operation becomes "through". Concretely, the power supply through circuit drive circuit 102 drives the power supply through circuit 1015. Due to this, the power supply voltage Vcc of 3.6V is passed and output as the drive voltage VDRV from the terminal TVO.

On the other hand, when the power supply voltage Vcc is within the range of 3.2V<Vcc<3.6V, the operation becomes the "boosting" operation for raising the voltage to 3.6V. Concretely, the boosted power supply drive circuit 1013 drives the boosted power supply 1016. Due to this, the power supply voltage Vcc is boosted to 3.6V or a value more than that and output as the drive voltage DVRV from the terminal TVO.

In order to turn on the red LEDs having the forward voltage Vfr of 1.9V, the voltage required as the drive voltage VDRV is 2.4V (=1.9V+0.5V).

The operation of the boosted/down-converted power supply 101 in this case becomes the "down-conversion" operation in the entire range since it is assumed that the power supply voltage Vcc is within the range of 3.2V<Vcc<4.2V.

Concretely, the down-converted power supply drive circuit 1011 drives the down-converted power supply 1014. Due to this, the power supply voltage Vcc is down-converted to 2.4V or any value down to 2.4V and output as the drive voltage DVRV from the terminal TVO.

That is, the operation of the boosted/down-converted power supply 101 becomes the "down-conversion" when the output of the boosted power supply 15 expected by applying feedback via the error amplifier 14 is less than the power supply voltage (battery voltage) Vcc and becomes "boosting" when the output of the boosted power supply 15 is the power supply voltage Vcc or more.

According to the third embodiment, in comparison with the above first embodiment, there are the advantages that a further improvement of the light emitting efficiency can be achieved and, in addition, a reduction of the power loss can be achieved.

Note that, needless to say, it is also possible to apply a circuit designed for the flashing operation explained in the second embodiment and give noise measures to the LED drive device 10B according to the third embodiment.

Fourth Embodiment

Figure 7:
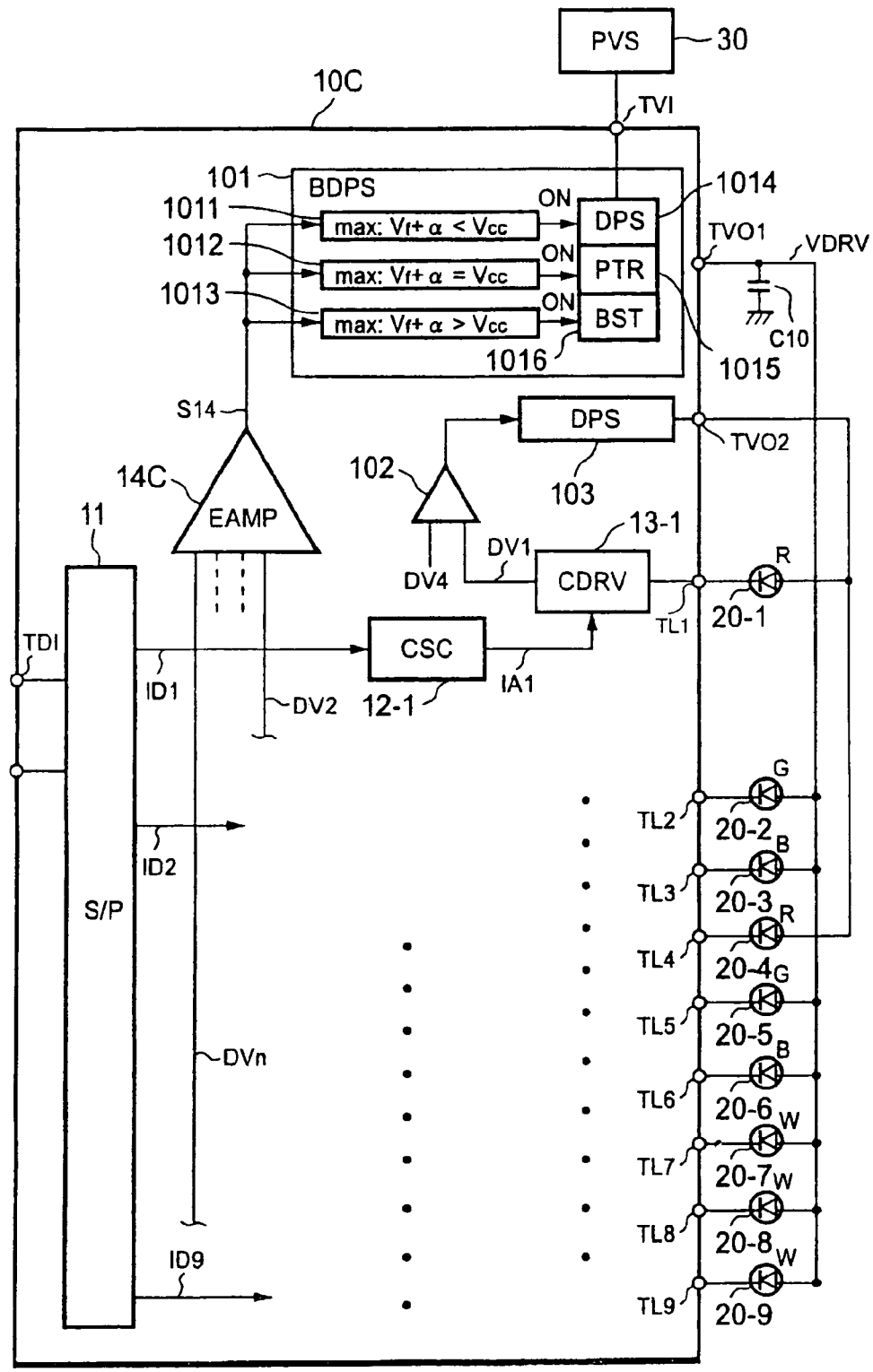
FIG. 7 is a circuit diagram of the principal configuration of a fourth embodiment of a LED (light emitting element) drive circuit according to the present invention.

FIG. 7 is a circuit diagram of the principal configuration of a fourth embodiment of a LED (light emitting element) drive circuit according to the present invention.

The difference of the fourth embodiment from the third embodiment resides in that in the case of the red LEDs 20-1 and 20-4, only a down-converted operation is possible, so an error amplifier 102 and a down-converted circuit 103 dedicated to the red LEDs 20-1 and 20-4 are provided, and a drive voltage obtained by down-converting the power supply voltage Vcc to 2.4V is separately supplied to the red LEDs 20-1 and 20-4.

Accordingly, the error amplifier 14C is supplied with the detection voltage signals DV2, DV3, and DV5 to DV9 from the current drive circuits 12-2, 12-3, and 12-5 to 12-9 corresponding to the green LEDs, the blue LEDs, and the white LEDs.

The rest of the configuration is the same as the configuration of FIG. 6.

According to the fourth embodiment, in comparison with the third embodiment, the overall light emitting efficiency can be raised.

Note that, needless to say, it is also possible to apply a circuit designed for the flashing operation explained in the second embodiment and give noise measures to the LED drive device 10C according to the fourth embodiment.

Fifth Embodiment

Figure 8:
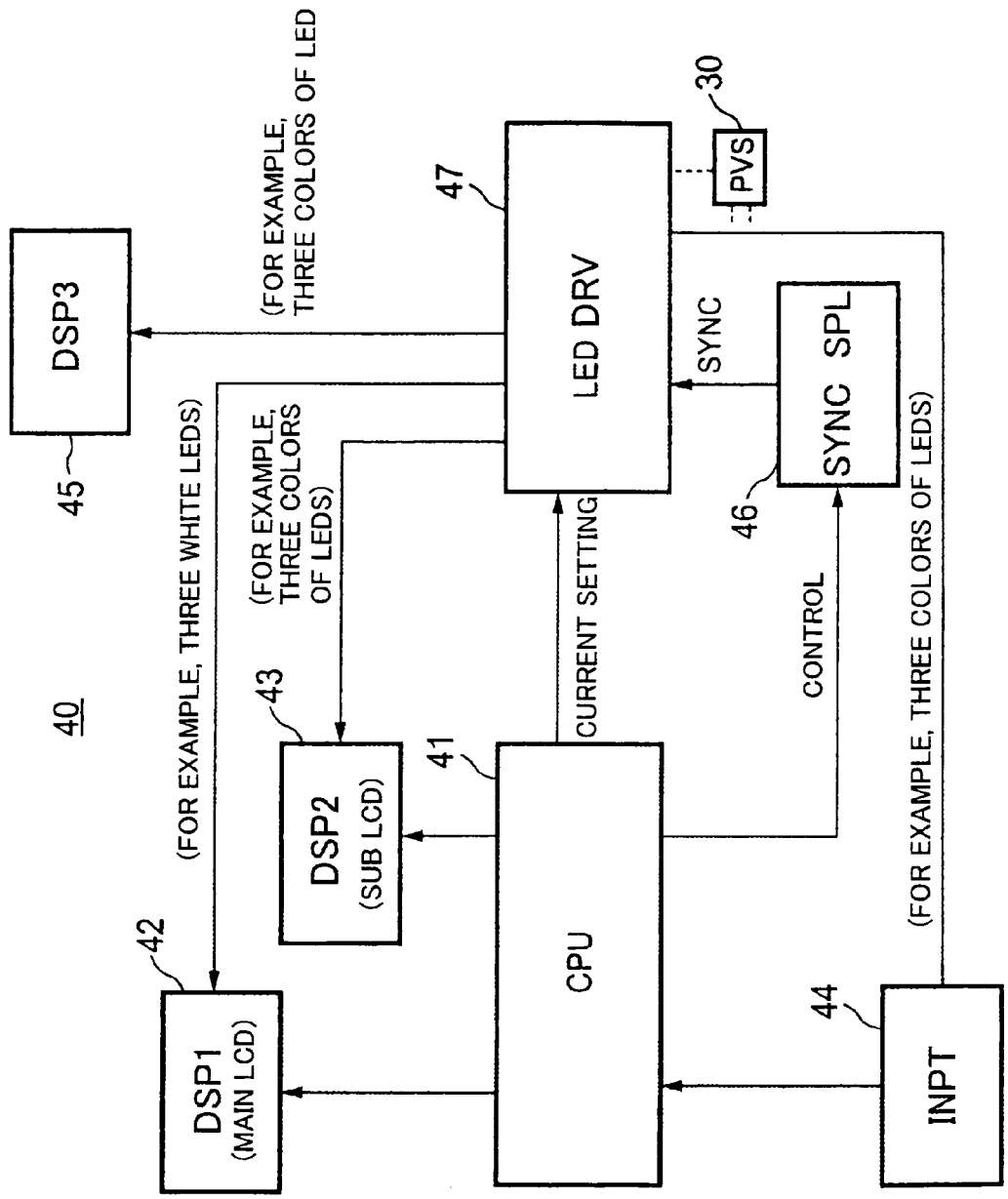
FIG. 8 is a block diagram of an example of the configuration of a portable apparatus (terminal) employing a LED (light emitting element) drive circuit according to the present invention.

FIG. 8 is a view for explaining a fifth embodiment of the present invention and a block diagram of an example of the configuration of a portable apparatus (terminal) to which the LED drive apparatuses according to the first to fourth embodiments explained above can be applied.

The portable apparatus 40 is configured by, for example a mobile phone set and, as shown in FIG. 8, has a CPU 41, a first image display (DSP1) 42, a second image display (DSP2) 43, an input device (INPT) 44, an incoming call display unit (DSP3) 45, a synchronization signal supply circuit (SYNC-SPL) 46, and a LED drive apparatus (LEDDRV) 47 having any of the configurations of the first to fourth embodiments explained above.

Then, the first image display 42, the second image display 43, the input device 44, and the incoming call display unit 45 form an illuminated portion illuminated by the LEDs.

The CPU 41 controls the operation of the device based on the input data from the input device 44, controls the display of the first image display 42 and the second image display 43 when the power supply is ON, controls the drive of the synchronization signal supply circuit 46, and controls the supply of the current (luminance) set data and the flashing operation command data, etc. in accordance with the operation mode to the LED drive apparatus 47.

The first image display 42 functions as the main display unit of the portable apparatus 40 and is configured by a liquid crystal display able to perform a color display.

The first image display 42 is provided near it, as the illumination use backlight, with three white LEDs (LEDs 20-7 to 20-9 in the examples of FIG. 6 and FIG. 7) connected in parallel with respect to the LED drive apparatus 47.

The first image display 42 displays, under the control of the CPU 41, a radio reception state, an icon menu, various types of images, and incoming other party telephone numbers and messages, etc. input by the input device 44.

The second image display 43 functions as a sub-display unit of the portable apparatus 40 and is configured by a liquid crystal display.

The second image display 43 is provided near it, for illumination, with LEDs of the three colors of red, green, and blue (LEDs 20-1 to 20-3 or 20-4 to 20-6 in the examples of FIG. 6 and FIG. 7) connected in parallel with respect to the LED drive apparatus 47.

The second image display 43 displays, under the control of the CPU 41, the time, date, etc. At the time of an incoming call or outgoing call, the LED drive apparatus 47 turns on or flashes one color, or any two colors or all colors of the LEDs among the three colors of LEDS.

The input device 44 has a power supply switch, a ten key, etc. and has near it, for illumination, LEDs of three colors of red, green, and blue (LEDs 20-1 to 20-3 or 20-4 to 20-6 in the examples of FIG. 6 and FIG. 7) connected in parallel to the LED drive apparatus 47.

The input device 44 is illuminated by one color, or any two colors or all colors of the three colors of LEDs from the LED drive apparatus 47 when the power supply is on under the control of the CPU 41.

The incoming call display unit 45 is provided with LEDs of three colors of red, green, and blue (LEDs 20-1 to 20-3 or 20-4 to 20-6 in the examples of FIG. 6 and FIG. 7) connected in parallel with respect to the LED drive apparatus 47.

In the incoming call display unit 45, the LED drive apparatus 47 turns on or flashes one color, or any two colors or all colors of LEDs among the three colors of LEDs at the time of an incoming call.

The synchronization signal supply circuit 46 is configured by a MIDI or another sound source IC and supplies a synchronization signal SYNC used, for example, for a flashing operation to the LED drive apparatus 47 under the control of the CPU 41.

Note that, for the power supply of the portable apparatus 40, in the same way as in the cases of the first to fourth embodiments explained above, use is made of a lithium ion battery.

The portable apparatus 40 having such a configuration is carried by the user in a state with a first portion provided with the first image display 42, the second image display 43, and the incoming call display 45 and a second portion provided with the input device 44 folded up, for example, by a hinge mechanism.

Then, when the user opens the first portion and the second portion, for example, when the power supply switch is turned on, in order to illuminate the first image display 42 by the backlight, current (luminance) setting data for driving the white LEDs are supplied to the LED drive apparatus 47 by the CPU 41.

Due to this, the LED drive apparatus 47 drives the white LEDs and illuminates the first image display 42 bright white.

Further, at this time, the current (luminance) setting data for driving the green LED are supplied to the LED drive apparatus 47 by the CPU 41 so as to illuminate, for example, the input device 44 by the green LEDs.

Due to this, the LED drive apparatus 47 drives the green LEDs and illuminates the input device 44 lightly green.

Further, in the state where the first portion and the second portion are folded up while, for example, the power supply is on, if there is an incoming call, in order to turn on or make the incoming call display unit 45 and the second image display 43 flash by, for example, the red LEDs, the CPU 41 supplies current (luminance) setting data for driving the red LEDs to the LED drive apparatus 47. Further, when the mode for performing the flashing operation is set, control is performed so that the CPU 41 outputs flashing operation instruction command data to the LED drive apparatus 47, and the synchronization signal supply circuit 46 supplies a synchronization signal SYNC to the LED drive apparatus 47.

Due to this, the LED drive apparatus 47 drives the red LEDs to turn on or make the incoming call display 45 and the second image display 43 flash red.

The operation of the LED drive apparatus 47 at the time of each above operation is the same as explained in the first to the fourth embodiments. The value of the power supply voltage Vcc is adjusted so that the voltage of the terminal to which the cathode of the LED having the maximum forward voltage Vf is connected becomes the reference voltage Vref set at the error amplifier 14 and is output as the drive voltage VDRV.

Due to this, even if the luminances of the plurality of LEDs are individually adjusted and even if the plurality of LEDs having different forward voltages are simultaneously driven, the lowest voltage satisfying the drive conditions is always output.

Accordingly, the light emitting efficiency is high, and the power loss is suppressed low.

Here, a detailed operation of the LED drive apparatus 47 will be omitted.

According to the portable apparatus 40 according to the fifth embodiment, there are the advantages that the lowest voltage satisfying the drive conditions can be always output for the illumination use LEDs, an improvement of the light emitting efficiency can be achieved, a reduction of the power loss can be achieved, and accordingly the service life of the battery can be prolonged.

INDUSTRIAL CAPABILITY

The light emitting element drive apparatus according to the present invention and a portable apparatus using the same can always output the lowest voltage satisfying the drive conditions, and an improvement of the light emitting efficiency and a reduction of the power loss can be achieved even if the luminances of a plurality of LEDs are individually adjusted and even if a plurality of LEDs having different forward voltages are simultaneously driven, so they can be applied to a mobile phone set driven by a battery, etc.

The invention claimed is:

1. A portable apparatus having a battery as a power supply voltage source, comprising:
   a plurality of light emitting elements of different drive voltages required for the light emission;
   a plurality of display devices illuminated by said light emitting element; and
   a light emitting element drive apparatus to which said plurality of light emitting elements are connected in parallel and driving one or more light emitting elements among the plurality of light emitting elements, and
   a control device to control a displaying function of said plurality of display devices and to control said light emitting element drive apparatus in response to mode of said light emitting element drive apparatus; and
   a synchronous signal supply circuit which is controlled by said control device supplies a synchronous signal to said light emitting element drive apparatus
   wherein said light emitting element drive apparatus includes:
   a plurality of drive circuits connected to corresponding light emitting elements of said plurality of light emitting elements and driving the corresponding light emitting elements with luminances based on set values;
   a decision circuit for deciding a drive voltage value required for the highest light emission among one or more light emitting elements driven to emit light based on drive states of said plurality of light emitting elements in response to the decision result of said decision circuit,
   wherein said light emitting element drive apparatus drives a plurality of light emitting elements illuminating a plurality of display devices by a least one of light emitting element drive apparatus.

2. An apparatus comprising:
   a plurality of light emitting elements of different drive voltages required for the light emission;
   a light emitting element drive apparatus to which said plurality of light emitting elements are connected and driving one or more light emitting elements among the plurality of light emitting elements,
   wherein said light emitting element drive apparatus includes:
   a drive circuit connected to corresponding light emitting elements of said plurality of light emitting elements, said drive circuit driving the corresponding light emitting elements with luminances based on a set value;
   a power supply circuit configured to decide a lowest drive voltage value required for satisfying a drive condition of one or more light emitting elements driven to emit light, said power supply circuit being configured to supply at least a drive voltage to the plurality of light emitting elements, wherein a voltage value of the drive voltage is the lowest drive voltage value.

3. An apparatus as set forth in claim 2, further comprising:
a display device illuminated by said light emitting elements.

4. An apparatus as set forth in claim 3, wherein the display device is back light illuminated by at least one of said light emitting elements.

5. An apparatus as set forth in claim 3, wherein said power supply circuit fixes the drive voltage to a predetermined set voltage irrespective of the drive states of the light emitting elements when receiving a predetermined flash operation instruction command.

6. An apparatus as set forth in claim 3, wherein said power supply voltage boosts a supplied power supply voltage to at least the decided voltage value when the value of said power supply voltage is smaller than the voltage value decided by said power supply circuit and supplies the boosted power supply voltage as said drive voltage to said plurality of light emitting elements.

7. An apparatus as set forth in claim 3, wherein said power supply circuit includes a boosted power supply boosting the supplied power supply voltage to at least the drive voltage value required for the light emission of the light emitting elements and supplying the boosted power supply voltage as the drive voltage to the one or more target light emitting diodes for the light emitting elements having the values of drive voltages required for emitting light larger than the value of the power supply voltage.

8. An apparatus as set forth in claim 3, further comprising:
a serial parallel conversion circuit converts digital serial data concerning the set value to drive the light emitting elements.

9. An apparatus as set forth in claim 2, wherein said power supply circuit decides the lowest drive voltage value by comparing a drive circuit voltage from each of light emitting elements with a reference voltage.

10. An apparatus as set forth in claim 2, wherein said power supply circuit supplies the drive voltage based on pulse width modulation.

11. An apparatus as set forth in claim 2, wherein said power supply circuit includes a down converted power supply for down converting a supplied power supply voltage to any value down to the drive voltage value required for the light emission of the light emitting elements and supplying the down converted power supply voltage as said drive voltage to the target light emitting elements for the light emitting elements having values of drive voltages required for emitting light smaller than the value of said power supply voltage.

12. An apparatus comprising:
one or more light emitting elements;
a light emitting element drive apparatus to which said one or more light emitting elements are connected and driving the one or more light emitting elements,
wherein said light emitting element drive apparatus includes:
a drive circuit connected to a corresponding light emitting element of said one or more light emitting elements, said drive circuit driving the corresponding light emitting element with luminances based on a set current value;
a power supply circuit configured to decide a lowest drive voltage value required for enabling driving at the set current value of a light emitting element having the highest forward voltage among the one or more light emitting elements driven to emit light, said power supply circuit being configured to supply at least the lowest drive voltage to the one or more light emitting elements.

13. An apparatus as set forth in claim 12, further comprising:
a display device illuminated by said light emitting elements, wherein the display device is back light illuminated by at least one of said light emitting elements.

14. An apparatus as set forth in claim 13, wherein said power supply circuit includes a boosted power supply boosting the supplied power supply voltage to at least the drive voltage value required for the light emission of the light emitting elements and supplying the boosted power supply voltage as the drive voltage to the one or more target light emitting elements for the light emitting elements having the values of drive voltages required for emitting light larger than the value of the power supply voltage.

15. An apparatus as set forth in claim 12, wherein said power supply circuit decides the lowest voltage value by comparing a drive circuit voltage from each of the light emitting elements with a reference voltage.

16. An apparatus as set forth in claim 12, wherein said power supply circuit supplies the drive voltage based on pulse width modulation.

17. An apparatus as set forth in claim 12, further comprising:
a serial parallel conversion circuit converts digital serial data concerning the set current value to drive the light emitting elements.

18. A display apparatus having a power supply voltage source, the apparatus comprising:
a plurality of light emitting elements of different drive voltages required for the light emission;
at least one illuminated portion illuminated by said light emitting element; and
a light emitting element drive apparatus to which said plurality of light emitting elements are connected in at least one of serial or parallel and driving one or more light emitting elements among the plurality of light emitting elements,
wherein said light emitting element drive apparatus includes:
a drive circuit connected to at least one corresponding light emitting element of the plurality of light emitting elements, said drive circuit driving the corresponding light emitting elements with luminances based on a set value,
a power supply circuit configured to decide a lowest drive voltage that satisfies a drive condition of one or more light emitting elements driven to emit light based on drive states of the plurality of drive circuits said power supply circuit includes a boosted power supply boosting a voltage from the power supply voltage source and supplies at least the boosted voltage to the plurality of light emitting elements,
wherein the drive voltage is the lowest drive voltage.

19. An apparatus as set forth in claim 18, wherein said power supply circuit decides the lowest drive voltage value by comparing a drive circuit voltage from each of light emitting elements with a reference voltage.

20. An apparatus as set forth in claim 18, wherein said power supply circuit supplies the drive voltage based on pulse width modulation.

21. An apparatus as set forth in claim 18, further comprising:
  a serial parallel conversion circuit converts digital serial data concerning the set value to drive the light emitting elements.

22. An apparatus as set forth in claim 17, further comprising:
  a current setting circuit, said current setting circuit converting the converted digital serial data from the digital serial conversion circuit and supplying the converted digital serial data to the drive circuit.

\* \* \* \* \*

UNITED STATES PATENT AND TRADEMARK OFFICE
CERTIFICATE OF CORRECTION

PATENT NO. : 8,654,059 B2  
APPLICATION NO. : 12/076996  
DATED : February 18, 2014  
INVENTOR(S) : Tsuchida et al.

Page 1 of 1

It is certified that error appears in the above-identified patent and that said Letters Patent is hereby corrected as shown below:

On Title Page 2, Item [56] Column 2, Line 2

"JP 2003-158199" should read -- JP 2003-158299 --.

Signed and Sealed this
Twenty-seventh Day of May, 2014

Michelle K. Lee
*Deputy Director of the United States Patent and Trademark Office*